2,771,412

United States Patent Office

Patented Nov. 20, 1956

2,771,412

CYANIDE COMPOSITIONS SUITABLE FOR ELECTROPLATING BATHS AND METHOD FOR THE PREPARATION THEREOF

Allan E. Chester, Highland Park, Ill., and Joseph T. Irwin, Lakewood, Ohio, assignors to Poor & Company, Chicago, Ill., a corporation of Delaware No Drawing. Application May 4, 1951,
Serial No. 224,661

6 Claims. (Cl. 204—46)

This invention relates to cyanide compositions derived from by-product aqueous cyanide solutions containing organic contaminants and to a method of treating such compositions to provide new and useful compositions suitable for employment in cyanide electroplating baths.

The term "by-product cyanide aqueous solution containing organic contaminants" is employed herein to describe an aqueous solution of a cyanide derived from coke oven gases by absorption of such gases in an aqueous solution of an alkali, as for example, sodium, potassium and/or ammonium hydroxides. A typical by-product cyanide composition derived by the absorption of coke oven gases in sodium hydroxide by the Kopper's process has the following composition by weight:

|  | Percent |
|---|---|
| Sodium cyanide (NaCN) | 30 |
| Sodium hydroxide (NaOH) | 2 |
| Sulfide and organic sulfur contaminants | 0.015 | calculated as $Na_2S$, and the remainder water.

It will be understood that the sulfide and organic sulfur contaminants, although calculated as sodium sulfide in the foregoing typical composition, are primarily present with sulfur combined in the form of an organic compound. These organic contaminants cause colored deposits in cyanide plating baths, for example, cyanide baths of gold, silver, cadmium, zinc, and copper. The electrodeposited plate is stained and porous. The contaminants also cause interference with anode corrosion and, hence, their presence results in inefficient electrodeposition.

One of the objects of the present invention is to provide a method of treating by-product aqueous cyanide solutions containing organic contaminants to make them useful as electrolytes in cyanide plating baths.

Another object of the invention is to provide new and useful aqueous alkaline cyanide compositions derived from coke oven gases and substantially free from organic contaminants which interfere with the electrodeposition of metals from cyanide plating baths containing the plating metal in dissolved form. Other objects will appear hereinafter.

These objects are accomplished in accordance with this invention by subjecting a by-product cyanide aqueous alkaline solution containing organic contaminants in which sulfur is present in an organically combined form to treatment with (1) An inorganic metal compound which forms water insoluble sulfides in alkaline solutions, for example, a compound of lead, copper, cadmium, or bismuth, and
(2) Activated carbon.

The resultant product is essentially an alkaline aqueous cyanide solution containing excess alkali and free from sulfides and other organic contaminants.

The desired product can be obtained by treating the by-product alkaline aqueous cyanide solution solely with activated carbon, but the amount of carbon required is relatively large and the time of treatment is too long for practical operations. It has been found that a certain amount of the undesired contaminants are alkali soluble organic compounds containing sulfur which are precipitatable by alkali soluble inorganic metal compounds that form sulfides insoluble in alkaline aqueous solutions. By adding such an inorganic sulfide forming metal compound to the by-product alkaline aqueous cyanide solution initially it is possible to reduce the amount of activated carbon required to remove the residual organic contaminants and also to reduce the time of treatment.

In the practice of the invention the first step is preferably effected by treating the by-product alkaline aqueous cyanide solution with an oxide of a metal which forms insoluble sulfides in alkaline aqueous solutions as, for example, lead oxide, cuprous oxide, cadmium oxide, and/or bismuth oxide. Salts of such metals can also be employed to remove the contaminants from the by-product aqueous alkaline cyanide but are less desirable for the purpose of the invention because they introduce into the resultant product an acid anion which interferes with the use of the product in electroplating, for example, by causing the formation of hydrogen cyanide, by adding undesirable chloride, nitrate or sulfate ions, or by otherwise complicating the electroplating operation. For this reason, although acetates and other salts of any of the meals enumerated can be used to precipitate some of the contaminants, their use does not represent the preferred practice of the invention.

The treatment with activated carbon is effected by making a filter cake containing about 25% by weight of activated carbon and a non-siliceous filter aid, for example, paper pulp. The material derived from the first step of the process is passed through the filter cake. In order to treat approximately 100 gallons of this material in six passes, approximately six pounds of activated carbon are required.

If it is desired to eliminate the first step of the process and remove all of the contaminant by treatment with activated carbon this can be done by mixing activated carbon with the by-product alkaline aqueous cyanide solution in the proportion of about one pound of activated carbon per 100 gallons of solution and then passing the resulting mixture through the previously described filter cake six times. Each time the material is passed through the filter cake an additional quantity of activated carbon must be added and the total quantity required is accordingly approximately double that required by the two-step process in which the by-product material is treated with an inorganic metal compound in the first step.

As will readily be understood by those skilled in the art, the quantity of inorganic metal compound employed in the first step of the process is an excess over the amount required to precipitate the sulfur present in the by-product aqueous cyanide solution. For example, where the amount of sulfur calculated as $Na_2S$ constitutes approximately 0.015% of the by-product cyanide material, we prefer to employ about two grams of litharge per gallon of the by-product cyanide material or the equivalent quantity of another sulfide precipitating metal compound. The precipitates formed in the first step are preferably removed in any suitable manner, for example, by filtration, and the residual filtrate then subjected to treatment with activated carbon in the second step of the process.

The product produced in accordance with the invention is suitable for use in any alkaline cyanide electroplating bath, as for example in cyanide plating baths containing gold, silver, cadmium, zinc, and copper in the form of a bath soluble compound.

The invention is hereby claimed as follows:

1. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment with an alkali soluble inorganic compound of a metal selected from the group consisting of lead, copper, cadmium, and bismuth to precipitate sulfurous substances, passing the resulting solution through a filter cake containing activated carbon, thereby removing detrimental substances from said by-product solution, providing a metal platable from an alkaline cyanide bath in the resulting purified by-product solution in a soluble form, and electroplating said metal from the resulting plating solution.

2. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment with an alkali soluble inorganic compound of a metal selected from the group consisting of lead, copper, cadmium, and bismuth to precipitate sulfurous substances, passing the resulting solution through a filter cake containing activated carbon, thereby removing detrimental substances from said by-product solution, providing a metal selected from the group consisting of gold, silver, cadmium, zinc, and copper in the resulting purified by-product solution in a soluble form, and electroplating said metal from the resulting plating solution.

3. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment with an alkali soluble oxide of a metal selected from the group consisting of lead, copper, cadmium, and bismuth to precipitate sulfurous substances, passing the resulting solution through a filter cake containing activated carbon, thereby removing detrimental substances from said by-product solution, providing a metal selected from the group consisting of gold, silver, cadmium, zinc, and copper in the resulting purified by-product solution in a soluble form, and electroplating said metal from the resulting plating solution.

4. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing as produced detrimental organic substances and sulfur, including organically combined sulfur, to treatment with lead oxide to precipitate sulfurous substances, passing the resulting solution through a filter cake containing activated carbon, thereby removing detrimental substances from said by-product solution, providing a plating metal selected from the group consisting of gold, silver, cadmium, zinc, and copper in the resulting purified by-product solution in a soluble form, and electroplating said metal from the resulting plating solution.

5. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing by weight about 30% of sodium cyanide, about 2% of sodium hydroxide, and about 0.015% of combined sulfur, calculated as $Na_2S$, to treatment with an alkali soluble inorganic compound of a metal selected from the group consisting of lead, copper, cadmium, and bismuth to precipitate sulfurous substances, passing the resulting solution through a filter cake containing activated carbon, thereby removing detrimental substances from said by-product solution, providing a plating metal selected from the group consisting of gold, silver, cadmium, zinc, and copper in the resulting purified by-product solution in a soluble form, and electroplating said metal from the resulting plating solution.

6. A method for electroplating metal from a by-product aqueous alkaline cyanide solution derived by absorbing coke oven gases in an aqueous alkaline solution, to produce an electrodeposited plate free from stain and porosity, which comprises first subjecting such a by-product solution containing by weight about 30% of sodium cyanide, about 2% of sodium hydroxide, and about 0.015% of combined sulfur, calculated as $Na_2S$, to treatment with lead oxide to precipitate sulfurous substances, passing the resulting solution through a filter cake containing activated carbon, thereby removing detrimental substances from said by-product solution, providing a plating metal selected from the group consisting of gold, silver, cadmium, zinc, and copper in the resulting purified by-product solution in a soluble form, and electroplating said metal from the resulting plating solution.

References Cited in the file of this patent

UNITED STATES PATENTS

| | | |
|---|---|---|
| 1,323,239 | Basore | Dec. 2, 1919 |
| 1,806,370 | Sperr | May 19, 1931 |
| 2,000,134 | Harris | May 7, 1935 |
| 2,201,760 | Burrage | May 21, 1940 |
| 2,219,713 | Schreiber | Oct. 29, 1940 |
| 2,248,092 | Korpiun | July 8, 1941 |
| 2,440,837 | Webster | May 4, 1948 |

OTHER REFERENCES

Smith: Metal Industry, November 10, 1939, pp. 415–417.

Diggin: American Electroplaters Monthly Review, May 1946, pp. 513–516.